United States Patent
Kawabe et al.

[15] 3,656,589
[45] Apr. 18, 1972

[54] SPOT TYPE DISC BRAKES

[72] Inventors: Tsuneo Kawabe, Hekikai Gun; Toyoaki Kobayashi, Toyohashi, both of Japan

[73] Assignee: Aisin Seiki Kabushiki Kaisha, Kariya, Japan

[22] Filed: May 5, 1970

[21] Appl. No.: 34,677

[30] Foreign Application Priority Data

May 10, 1969 Japan.................................44/43020
May 13, 1969 Japan.................................44/43717

[52] U.S. Cl............................................188/72.5, 188/73.4
[51] Int. Cl.........................................................F16d 55/228
[58] Field of Search......................188/72.4, 72.5, 73.3, 73.4

[56] References Cited
UNITED STATES PATENTS 3,245,500  4/1966  Hambling et al..................188/73.4 X
3,421,602  1/1969  Craske...............................188/73.4
3,480,116  11/1969 Rath..................................188/73.3
3,493,084  2/1970  Maurice...........................188/73.4 X

*Primary Examiner*—George E. A. Halvosa
*Attorney*—Pierce, Scheffler & Parker

[57] ABSTRACT

A spot type disc brake for wheels wherein a hydraulic cylinder housing has at each side a torque-receiving arm comprising a projection extending above and across a brake disc of the outer end the lower half of the projection being cut away or recessed to permit an one inner edge of a reaction transfer plate to move thereinto below the projection.

4 Claims, 6 Drawing Figures

INVENTORS
Tsuneo Kawabe
BY Toyoaki Kobayashi

Pierce Schiffler & Parker
Attorneys

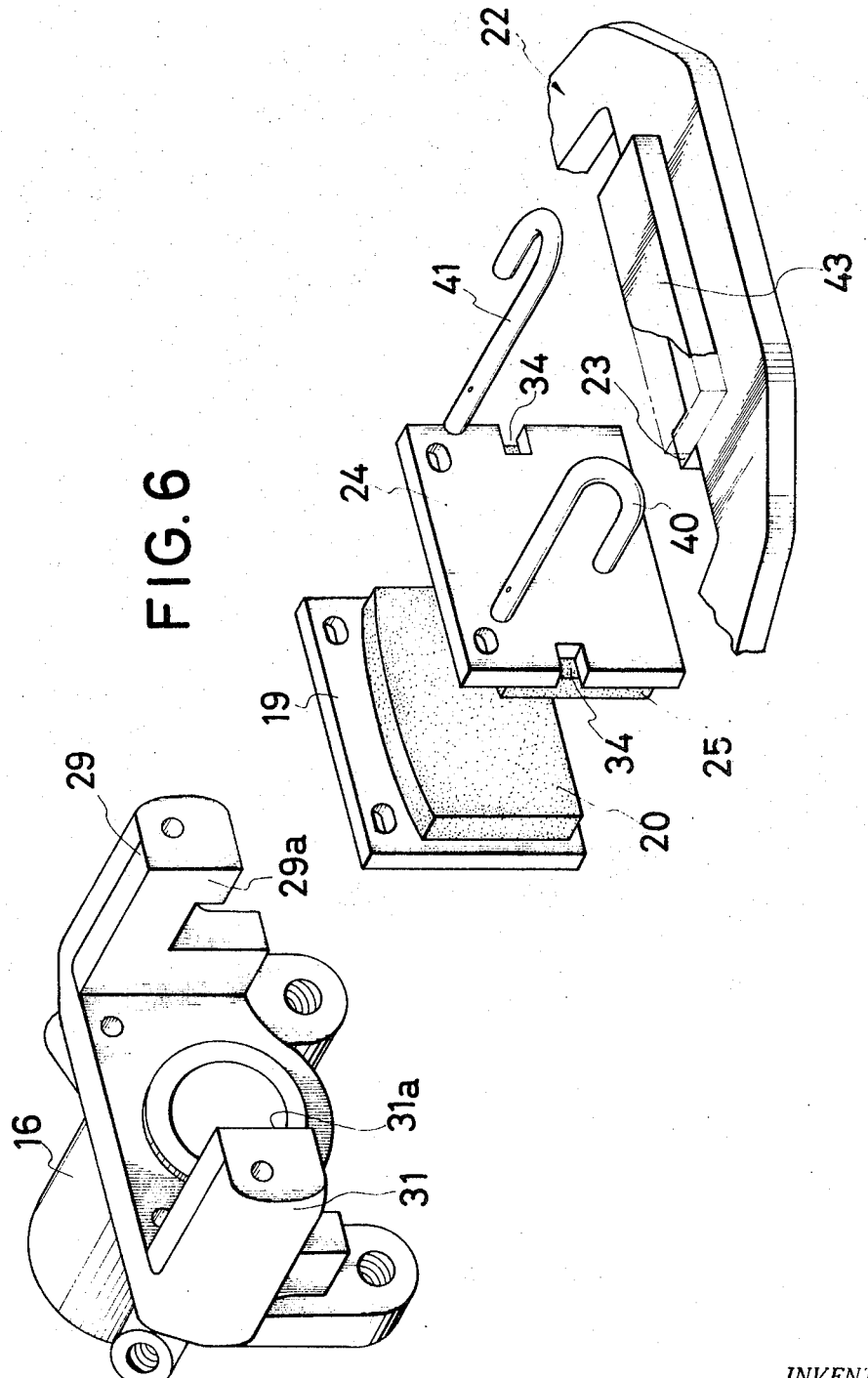

3,656,589

SPOT TYPE DISC BRAKES

BACKGROUND OF THE INVENTION

This invention relates to hydraulic disc brakes of the so-called spot type. More particularly, the invention relates to a new and improved disc brake for wheels in which a hydraulic cylinder housing is positioned on one side of a brake disc, and braking is accomplished by causing a movable transfer plate straddling the brake disc to move in the axial direction of the brake disc.

The transfer plate is subject to combined stress of shear and bending when the brake is applied so that it requires sufficient strength or rigidity to bear the reaction force in the brake disc axial direction. However, such transfer plate, especially its length in the said axial direction, is strictly bounded by the limited, narrow space about the wheels. Therefore, with conventional transfer plates it has been necessary to remove a portion of the plate so as not to interfere with the torque-receiving arms during the application of the brake, at the sacrifice of its rigidity.

Such an arrangement has its drawbacks. When the brake is applied in an emergency or when the vehicle carries a heavy load, braking could not be sufficiently accomplished due to the lack of rigidity of the transfer plate.

SUMMARY OF THE INVENTION

Accordingly, the principal object of the invention is to overcome the above difficulties in the prior art by providing a new and improved spot type disc brake in which the torque-receiving arms are cut away or recessed at the lower outer end thereby enabling one to use a sufficiently large and rigid transfer plate by allowing the transfer plate to move under the torque-receiving arms.

Further objects and advantages of the present invention will be apparent from the following description, reference being had to the accompanying drawings wherein two embodiments of the present invention are clearly shown.

BRIEF DESCRIPTION OF THE DRAWINGS

In the drawings:

FIG. 6 is an exploded view similar to FIG. 3 of the modified embodiment of FIGS. 4 and 5.

DETAILED DESCRIPTION OF THE INVENTION

Figure 1:
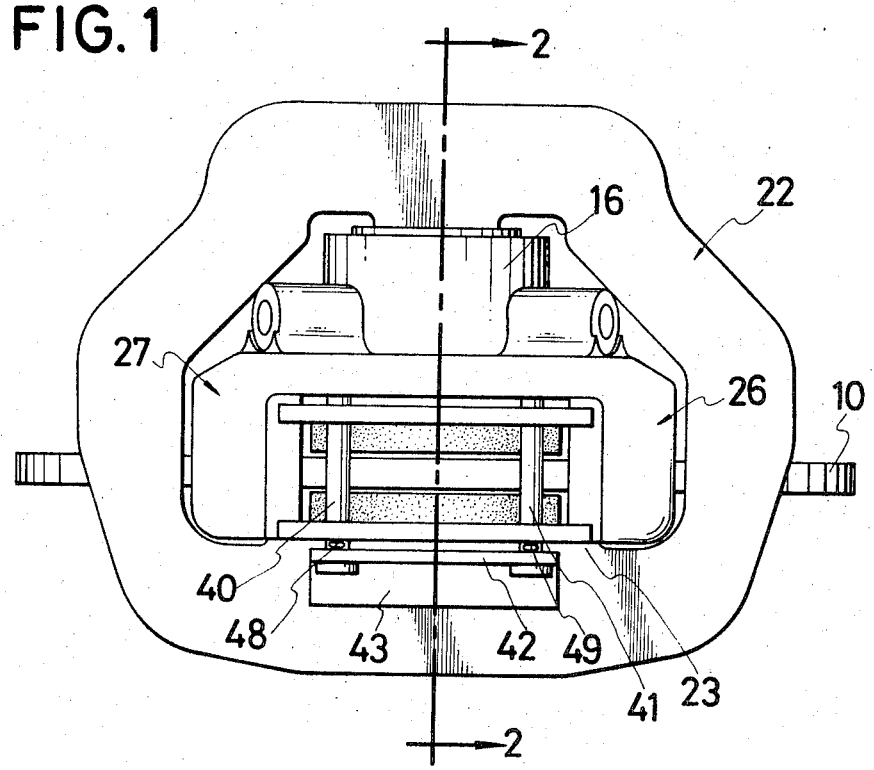
FIG. 1 is a plan view of a spot type disc brake in accordance with the invention.
Figure 2:
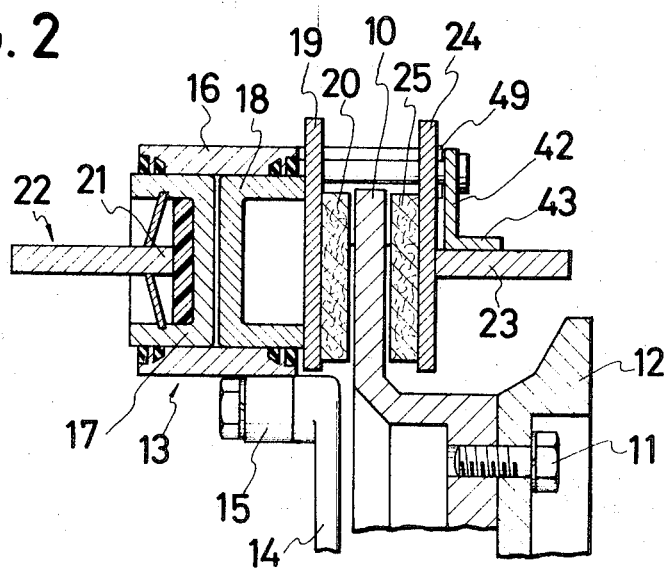
FIG. 2 is a sectional view taken along the line 2—2 of FIG. 1.
Figure 3:
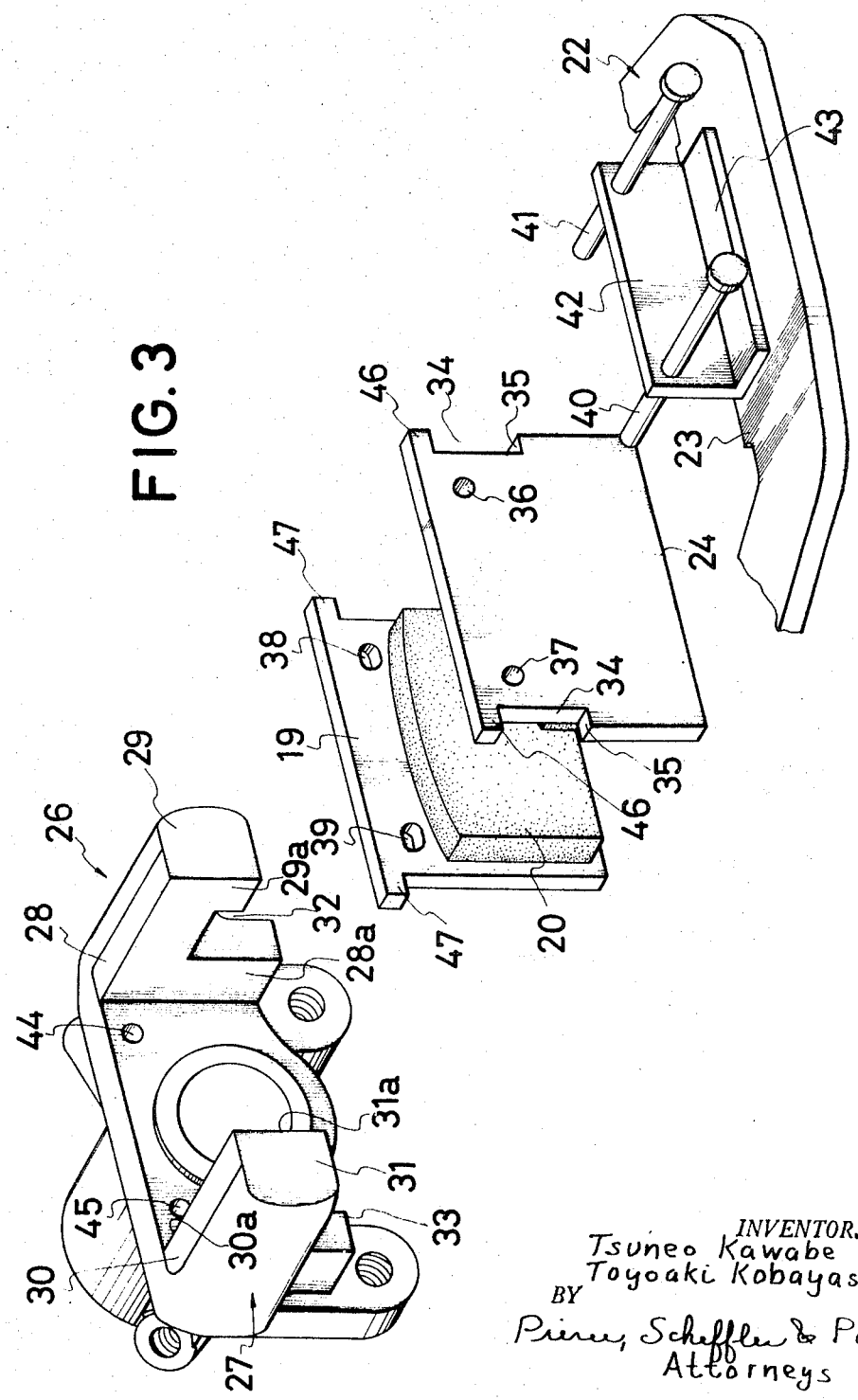
FIG. 3 is a perspective exploded view showing elements of the disc brake of FIGS. 1 and 2.

Referring first to FIGS. 1 to 3, a disc 10 is fixed by bolts 11 to a hub 12 of a vehicle wheel (not shown) and constitutes a rotating brake disc. The flank surfaces of the disc 10 are squeezed, during braking, by a caliper-type clamping mechanism. A stationary member 13 is mounted at its projecting parts 15 on a fixed par 14 and is located on one side of the disc 10. The stationary member 13 incorporates hydraulic cylinder housing 16 having two open ends. Within the cylinder housing 16, there are slidably fitted two opposed pistons 17 and 18. One piston 18 is directly engaged with a backing plate 19 of a brake pad 20 confronting one of the braking surfaces of the disc 10, while the other piston 17 engages one inner edge 21 of a transfer plate 22 for transferring the piston movement to the other brake pad 25. An inside portion 23 of the transfer plate 22 opposite to the edge 21 is kept in contact with a backing plate 24 of the brake pad 25 facing the other braking surface of the brake disc 10.

The stationary member 13 has at its sides torque-receiving arms 26 and 27 formed integrally with the cylinder housing 16. One torque-receiving arm 26 has a first inner portion 28 comprising a flat surface 28a for slidably guiding one side of the backing plate 19 and the brake pad 20, and has a second outer portion 29 extending from the first portion 28 above and across the brake disc 10 and comprising a flat surface 29a for receiving one side of the backing plate 24 and the brake pad 25. Similarly, the other torque-receiving arm 27 has a first inner portion 30 comprising a flat guiding surface 30a for the other side of the backing plate 19 and the brake pad 20, and a second outer portion 31 comprising a flat guiding surface 31a for the other side of the backing plate 24 and the brake pad 25. It should be noted that the lower half of the second outer portions 29 and 31 are cut away or recessed in comparison with the first inner portions 28 and 30 so that the inside portion 23 of the transfer plate 22 will pass below the portions 29 and 31 in the brake disc axial direction when the brake is applied or released.

Both torque-receiving arms 26 and 27 are provided with slots 32 and 33, respectively, in which the outer periphery of the rotatable disc 10 is received.

The backing plate 24 has, at each side thereof, a rectangular slot 34 to engage the outer portions 29 and 31, and the step portions 35 will prevent the backing plate 24 from movement cause by the torque created by engagement of pad 25 with disc 10 and from radial movement with respect to the torque-receiving members 26 and 27.

In the upper extensions of the backing plates 19 and 24, there are provided slots 36 to 39 through which two parallel pins 40 and 41 are passed. The outer ends of the pins 40 and 41 support an upstanding lug 42 of a steel member 43 which is welded to the inner portion 23 of the transfer plate 22, while the inner ends of the pins are axially slidable in openings 44 and 45 in the cylinder housing 16. Between the backing plate 24 and the upstanding lug 42, split pins 48 and 49 are provided on the outer ends of the parallel pins 40 and 41. It should be noted that the load of the transfer plate 22 is carried by the other piston 17 and the torque-receiving arms 26 and 27 by means of shoulders 46 of the backing plate 24, so that substantially no load of the transfer plate 22 is taken by the pins 40 and 41.

The backing plate 19 has on each outer side thereof a shoulder 47 which is slidably mounted on the first inner portion of each torque-receiving arm but has no step portion corresponding to the step portion 35 of the backing plate 24, so that the radial movement of backing plate 19 is restricted by the pins 40 and 41.

Figure 5:
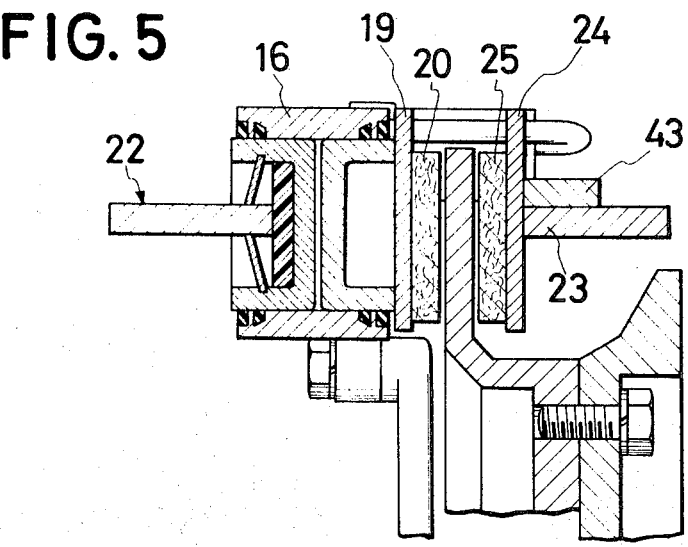
FIG. 5 is a sectional view taken along the line 5—5 of FIG. 4.

In operation, when the brake is applied, the two pistons 17 and 18 are urged apart and the piston 18 applies the brake pad 20 directly to one surface of the disc 10 while the piston 17 moves the transfer plate 22 in the opposite direction to apply the brake pad 25 to the opposite surface of the disc 10, the forces applied to the two pads being balanced. The brake pads 20 and 25, as shown in FIGS. 2 and 5 are disposed radially inside the outer circumference of the brake disc 10. The pins 40 and 41 are moved axially with the transfer plate 22 by virtue of the split pins 48 and 49.

The inner portion 23 of the transfer plate 22 may pass below the second portions 29 and 31 without interference therof. The torque created on the brake pad 20 in the direction of rotation of the disc 10 is absorbed by the guiding surfaces 28a and 30a while the torque on the indirectly actuated pad 25 is absorbed by the guiding surfaces 29a and 31a, so that no torque is transmitted to the transfer plate 22. The absorption of torque by the guiding surfaces 28a, 30a, 29a and 31a is obtained because the inner portions 28 and 30 and the outer portions 29 and 31 of the torque receiving arms 26 and 27 are disposed along at least a portion of the opposed sides of the backing plates 19 and 24 and the pads 20 and 25 so as to be substantially in line with a tangent to the line of torque when the brake pads are applied to the brake disc.

Figure 4:
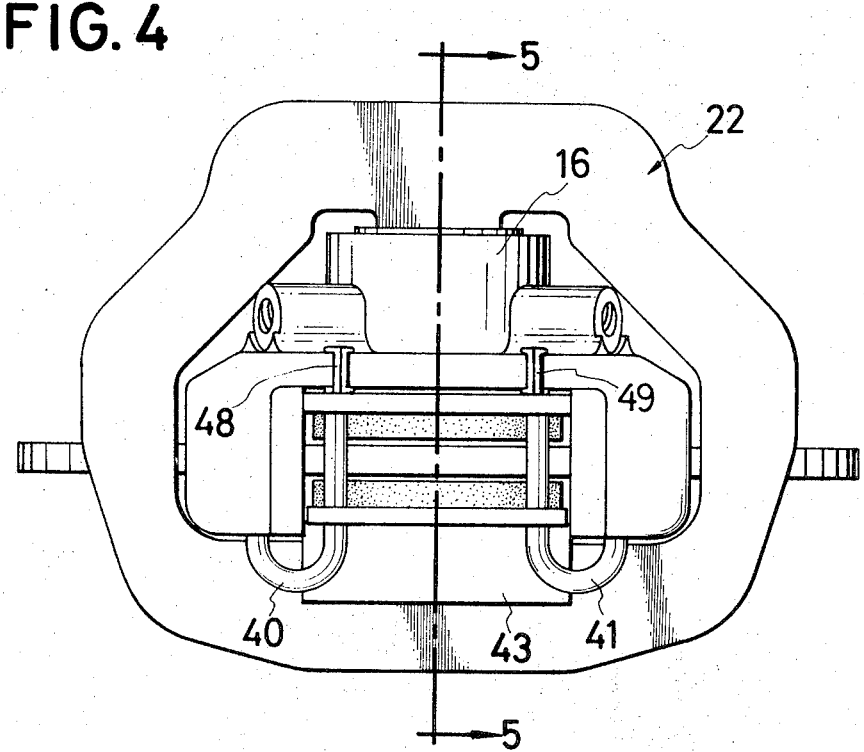
FIG. 4 is a plan view, similar to FIG. 1, but showing a modified embodiment.

In a modification of the foregoing embodiment, as shown in FIGS. 4 to 6, the lower half of the second outer portions 29 and 31 are cut away or recessed to permit the transfer plate 22 to pass therebelow in the same manner as in the foregoing embodiment. The two backing plates 19 and 24 rigidly mounting the brake pads 20 and 25 thereon are slidably supported by U-shaped pins 40 and 41. The pins 40 and 41 are fixed at their inner ends in the sylinder housing 16 and at their outer ends in the second outer portions 29 and 31. The inner ends of the parallel pins 40 and 41 are provided with split pins 48 and 49 to prevent the pins 40 and 41 from being withdrawn with respect to the cylinder housing 16. The backing plate 24 has on each side the slot 34 which engages with the inner edge 23 of the transfer plate 22.

Behind the backing plate 24, there is provided a steel member 43 which is welded to the transfer plate 22 and is slidably guided by the second outer surfaces 29a and 31a. It should be recognized that the indirectly actuated backing plate 24 is not guided by the flat surfaces 29a and 31a but is slightly spaced therefrom as is shown in FIG. 4.

The description about the operation of the modified form will be omitted since it is substantially the same as that descried for the foregoing embodiment. The main difference lies in the manner in which the torque is received. Upon the application of the brake, the torque created on the brake pad 25 is transmitted to the steel pressing 43 and is absorbed by the second outer portions 29 and 31.

We claim:

1. A spot type disc brake for a vehicle wheel comprising a rotatable brake disc, a hydraulic cylinder housing located at one side of said brake disc, two opposed pistons slidably mounted within said cylinder housing, a first backing plate and brake pad actuated by one of said pistons and located between said one piston and said brake disc, a second backing plate and brake pad located on the opposite side of said brake disc, said brake pads being radially located within the outer circumference of said brake disc, a transfer member operably connected at one portion to said other piston for operating said second backing plate and brake pad by an opposite portion of said transfer member, pins for supporting said backing plates, two parallel, spaced, torque-receiving arms extending from said cylinder housing axially of and across said brake disc and adjacent the sides of said first and second backing plates and brake pads, each torque-receiving arm including a first inner portion adjacent one side of said first backing plate and brake pad and a second outer portion adjacent one side of said second backing plate and brake pad, both inner and outer portions of said arms being disposed along at least a portion of the opposed sides of said backing plates and brake pads so as to be substantially in line with a tangent to the line of torque when said brake pads are applied to said brake disc, the outer portion of each arm having a recess in its lower half to permit said transfer member to move into the recess when the brakes are applied.

2. A spot type disc brake as claimed in claim 1 wherein each side of said second backing plate is provided with a recess for slidable engagement with the second outer portions of said torque-receiving arms.

3. A spot type disc brake as claimed in claim 1 and further comprising a member secured to said transfer plate adjacent said second backing plate, said member being provided with an upstanding lug for receiving the outer ends of said supporting pins.

4. A spot type disc brake as claimed in claim 1 and further comprising a member secured to said transfer plate adjacent said second backing plate, the ends of said member slidably engaging the second outer portions of said torque-receiving arms to absorb torque transmitted thereto by said second backing plate and brake pad.

* * * * *